United States Patent

Ashby et al.

[15] 3,639,104

[45] Feb. 1, 1972

[54] PREPARATION OF MAGNESIUM ALUMINUM HYDRIDE

[72] Inventors: Eugene C. Ashby; Walter E. Foster; Horace E. Redman, all of Baton Rouge, La.

[73] Assignee: Ethyl Corporation, New York, N.Y.

[22] Filed: Mar. 29, 1963

[21] Appl. No.: 269,849

[52] U.S. Cl. ............................................... 23/365, 23/312
[51] Int. Cl. .................... C01b 6/32, C01b 6/24, B01d 11/00
[58] Field of Search ........................................................ 23/14

[56] References Cited

UNITED STATES PATENTS 3,179,490   4/1965   Musinski et al. ........................... 23/14

Primary Examiner—M. Weissman
Attorney—Donald L. Johnson

EXEMPLARY CLAIM

1. A method for the preparation of magnesium aluminum hydride which comprises reacting sodium aluminum hydride with an anhydrous magnesium halide in an ether as reaction solvent said ether being selected from the group consisting of unsubstituted alkyl ethers, diethylene glycol dialkyl ethers, and tetrahydrofuran mechanically separating the impure solid reaction products, separating magnesium aluminum hydride etherate from said reaction product by treatment with an ether as extractant for said etherate said ether being selected from the group consisting of unsubstituted alkyl ethers, diethylene glycol dialkyl ethers and tetrahydrofuran removing said extractant from the extract by evaporation thereof to dryness, removing the complexed ether by heating said etherate under reduced pressure to a temperature not in excess of 100° C. and recovering essentially ether-free magnesium aluminum hydride.

10 Claims, No Drawings

PREPARATION OF MAGNESIUM ALUMINUM HYDRIDE

This invention to a novel method for the preparation of magnesium aluminum hydride, $Mg(AlH_4)_2$, and more particularly to a method for preparing magnesium aluminum hydride free of complexed ether.

It has been reported that magnesium aluminum hydride can be prepared from magnesium hydride and an aluminum halide (E. Wiberg and R. Bauer, Z. Naturforschung 7b, 131–132 (1952)), but this finding is apparently erroneous since it is contradicted by reports of several later investigations. The reaction of lithium aluminum hydride with magnesium bromide to produce magnesium aluminum hydride has also been reported, but it has been found impossible to repeat the preparation under the described conditions.

Accordingly, it is an object of this invention to produce magnesium aluminum hydride. Another object is to produce unsolvated magnesium aluminum hydride in a relatively high state of purity. Another object is to produce magnesium aluminum hydride from relatively inexpensive raw materials. Other objects will appear hereinafter.

It has now been found that these and other objects of this invention can be accomplished by the provision of a novel method for the preparation of magnesium aluminum hydride. This comprises reacting an alkali metal aluminum hydride with an anhydrous magnesium halide in an ether as solvent, mechanically separating (e.g., by filtration) the impure solid reaction product, separating the magnesium aluminum hydride etherate from the reaction product by treatment (e.g., extraction) with a suitable solvent for the magnesium aluminum hydride etherate, removing the solvent from the extract by evaporation to dryness, and removing the complexed ether from the residual etherate by heating the magnesium aluminum hydride etherate under reduced pressure to a temperature not in excess of 100° C., thereby leaving essentially ether-free magnesium aluminum hydride as the final product.

A preferred embodiment of this invention is the use of sodium aluminum hydride, $NaAlH_4$ as a reactant. This reactant is preferred because when it is used in stoichiometric proportions a substantially pure product is obtained which is essentially free of halide contamination, whereas the use of $LiAlH_4$ results in a product contaminated with large amounts of chloromagnesium aluminum hydride, $ClMgAlH_4$. Furthermore, this reactant is the cheapest and most readily obtainable of the alkali metal aluminum hydrides.

The use of anhydrous magnesium chloride is another preferred embodiment because this is the least expensive and most readily available of the anhydrous magnesium halides and because the byproduct sodium chloride is less soluble in, and therefore more readily separated from, the reaction solvent than sodium bromide or sodium iodide.

Still another preferred embodiment is the combination of the use of dimethyl ether as reaction solvent with that of diethyl ether extractant, because this combination appears to be associated with highest yield and purity of product.

In general, the process of this invention proceeds smoothly at room temperature or at only moderately elevated temperatures, thus avoiding the necessity of using expensive, specially constructed equipment.

The invention will be more fully understood by reference to the following illustrative examples in which all parts and percentages are by weight. Reactions using tetrahydrofuran were carried out in a dry box using conventional laboratory glassware with tapered joints. Stirring was accomplished with a Teflon-covered magnetic stirring bar. Filtrations were conducted in the dry box with moderate vacuum using a fine porosity sintered glass filter funnel.

Reactions using dimethyl ether as solvent were carried out in an autoclave under autogenous pressure of the solvent.

EXAMPLE I $Mg(AlH_4)_2$ From $NaAlH_4$ and $MgCl_2$ in Tetrahydrofuran

Anhydrous magnesium chloride (8.1 grams, 0.093 mole) is placed in a 1-liter round-bottom flask and 400 ml. of tetrahydrofuran (THF) freshly distilled over lithium aluminum hydride is added; with stirring, most of the magnesium chloride dissolves. At room temperature, 300 ml. of a tetrahydrofuran solution containing 9.43 grams (0.175 mole) of sodium aluminum hydride is added gradually to the magnesium chloride solution over a 20-minute period. A small amount of gas is evolved during the addition of the first 20 ml. of the sodium aluminum hydride solution. No gas evolution is observed during the rest of the addition. The reaction is continued with stirring for 6 hours. The slurry of white solids in tetrahydrofuran is filtered and the recovered solids are dried at 30° C. and 5 mm. to remove the bulk of the free tetrahydrofuran, thereby producing 25 grams of magnesium aluminum hydride THF etherate admixed with sodium chloride. The approximate composition is 25 weight percent sodium chloride, 17 percent $Mg(AlH_4)_2$ and 58 percent tetrahydrofuran. On further drying, more tetrahydrofuran is evolved and the composition approaches $Mg(AlH_4)_2 \cdot 3THF$.

The impure magnesium aluminum hydride THF etherate is then placed in a standard Soxhlet extraction apparatus containing an Alundum thimble and is extracted with 600 ml. of diethyl ether contained in a 1-liter round-bottom flask. The diethyl ether extractant is stirred with a Teflon-covered magnetic stirring bar. Precipitated white solids gradually accumulate in the diethyl ether as the extraction proceeds. The extraction is run for 120 hours. The diethyl ether is distilled off at atmospheric pressure to incipient dryness, then finally removed at 25° and 1 mm. The composition of the solids recovered from the diethyl ether is about 0.5 weight percent sodium chloride, 28 percent $Mg(AlH_4)_2$, and 71 percent tetrahydrofuran.

The solid $Mg(AlH_4)_2 \cdot THF$ etherate is freed of complexed THF by heating the etherate in an oil bath at 60° C. and $10^{-3}$ mm. for 2 days on a vacuum rack with a liquid nitrogen trap to collect the THF. The product is magnesium aluminum hydride containing about 15 percent THF and small amounts of other impurities.

When the magnesium chloride reactant in the above example is replaced by anhydrous magnesium bromide or iodide, similar results are obtained.

When the above experiment is repeated using tetrahydrofuran as the extractant in place of diethyl ether, a comparable amount of product is extracted at 66° C. in 6 hours as compared to 120 hours for diethyl ether. However, the concentration of sodium chloride in the tetrahydrofuran-extracted product is 6 times greater than in the diethyl ether-extracted product.

EXAMPLE II

Effect of Lithium Aluminum Hydride

In contrast to the above example, when 2 moles of lithium aluminum hydride (instead of the sodium derivative) are reacted with 1 mole of magnesium chloride in tetrahydrofuran, no precipitate forms since all the products are soluble. Evaporation of the solvent results in the isolation of chloromagnesium aluminum hydride as the tetrahydrofuran etherate ($ClMgAlH_4 \cdot THF$) in 33 percent yield, based upon the magnesium chloride.

EXAMPLE III $Mg(AlH_4)_2$ From $NaAlH_4$ and $MgCl_2$ in Dimethyl Ether

The magnesium aluminum hydride sample was prepared in 6 separate reactions, each using 10.0 grams of $NaAlH_4$ (99 percent) and 8.8 grams of $MgCl_2$ (99 percent) in 130 ml. of dimethyl ether ($Me_2O$). The reactions were carried out at room temperature (27° C.) under autogenous pressure of dimethyl ether in a Magne-Dash autoclave for 6 hours or more. The ether was vented off and the dry white reaction solids were recovered in a dry nitrogen box. A total of 198 grams of crude reaction solids was recovered from the 6 reactions; 85 grams of the recovered solid was $Me_2O$ complexed with the $Mg(AlH_4)_2$, which indicates that the solids had a composition of $Mg(AlH_4)_2 \cdot 3Me_2O$. The separation of $Mg(AlH_4)$ from NaCl was carried out by continuous Soxhlet extraction with diethyl ether of 25 gram portions of the reaction solids in an Alundum extraction thimble for 40 hours. During the initial part of the extraction, the complexed $Me_2O$ was displaced by diethyl ether ($Et_2O$); the $Me_2O$ escaped through the nitrogen bubbler system used to maintain a nitrogen atmosphere in the system. The $Et_2O$ was distilled from the $Et_2O$ slurry of white solids—$Mg(AlH_4)_2 \cdot nEt_2O$—at atmospheric pressure, then the white solids were dried at 30° C. and 1 mm. for 1 hour. The composition of these solids was $Mg(AlH_4)_2 \cdot Et_2O$. The solid $Mg(AlH_4)_2 \cdot 1Et_2O$ was freed of complexed $Et_2O$ by heating (oil bath) at 60° C. and $10^{-3}$ for 50 hours on a vacuum rack with a liquid nitrogen trap to collect the $Et_2O$. Part of the recovered $Mg(AlH_4)_2 \cdot 1Et_2O$ was freed of ether by heating the etherate at 60° C. and $10^{-3}$ mm. for 24 hours, then for 1 hour at 90° C. and $10^{-3}$ mm. In all, 39.4 grams of ether-free $Mg(AlH_4)_2$ was obtained from the 6 reactions, with a purity of 90 to 93 percent, corresponding to an 82 percent yield.

The density of this product was found to be $1.168 \pm 0.003$ g./cc. at 25° C. by displacement of 2.2.5-trimethyl hexane. The product ignites on contact with water.

Chemical Analysis

| | mg. weight percent | 25.34 |
|---|---|---|
| | al. | 56.94 |
| | H (hydride hydrogen) | 8.34 |
| | Na | 1.97 |
| | Cl | 0.86 |
| | $Et_2O$ (by VPC) | 1.90 |
| | Unknown | 4.65 |
| | | 100.00 |
| | Product Purity | 90.62 |

When the magnesium chloride reactant in the above example is replaced by anhydrous magnesium bromide or iodide, or when the sodium aluminum hydride reactant is replaced by potassium aluminum hydride, similar results are obtained.

EXAMPLE IV $Mg(AlH_4)_2$ From $NaAlH_4$ and $MgCl_2$ in Diethyl Ether
$NaAlH_4$ (5 grams) and $MgCl_2$ (4.3 grams) are reacted in diethyl ether (100 ml.) at 50° C. for 16 hours in an autoclave. The solids recovered from this reaction are extracted for 72 hours with 200 ml. of diethyl ether in a Soxhlet extraction apparatus. The white solids extracted (2.92 grams) are about 50 percent Mg. +Al. +$H_2$ and contain only 0.9 percent Na and 0.9 percent Cl. The other 48 percent of these solids is assumed to be diethyl ether. This analysis corresponds approximately to the composition $Mg(AlH_4)_2 \cdot Et_2O$. The separation of NaCl from the Mg- and Al-containing solids is good; however, the analysis indicates that an excess of magnesium is extracted over that equivalent to the aluminum extracted. In the residual solids left in the extraction thimble there is an excess of aluminum over that equivalent to the magnesium.

The solid $Mg(AlH_4)_2 \cdot Et_2O$ is freed of most of the complexed ether by heating on an oil bath at 60° C. and $10^{-3}$ mm. for 2 to 3 days on a vacuum rack with a liquid nitrogen trap to collect the $Et_2O$. The product is magnesium aluminum hydride containing up to about 5 percent $Et_2O$ and small amounts of other impurities.

When example IV is repeated using dimethyl ether as the extractant, similar results are obtained.

A variety of reactants can be used in the process of this invention. For example, in place of sodium aluminum hydride, the complex aluminum hydrides of the other alkali metals: namely, of lithium, potassium, rubidium and cesium, may be employed. However, the sodium derivative is preferred because it is much the cheapest and most readily available of the alkali metal derivatives, and because use of the lithium derivative results in incomplete reaction. Similarly, with respect to the magnesium halide reactants, not only the chloride but also the bromide and iodide may be employed. Of these, the chloride is preferred for reasons of economy and for ease of separation of the sodium chloride product.

The reactants are normally combined in approximately the stoichiometric ratio, that is, in the ratio of 2 moles of sodium aluminum hydride to 1 mole of magnesium halide. The ratio of the reactants may range from approximately stoichiometric to a 100 percent or greater excess of the alkali metal aluminum hydride. A moderate excess, say about 12 mole percent, of the hydride is useful for increasing the rate and the degree of completeness of the reaction and is therefore preferred. A larger excess does not harm, but does not produce results commensurate wit the additional expense involved. The use of an excess of the magnesium halide results in the formation of a halomagnesium aluminum hydride as an impurity, the amount of this impurity increasing with the amount of the excess of magnesium halide employed.

Among the criteria for the choice of solvents to be employed in the reactions of this invention are that the solvent be liquid under reaction conditions, that they be inert to both reactants and products, that they exhibit appreciable solubility for at least one of the reactants, and that they have boiling points, under the reaction pressure employed low enough to permit their distillation from the product without thermal decomposition thereof. Accordingly, the solvents may include aliphatic or aromatic ethers, such as dimethyl ether, diethyl ether, di-n-butyl ether, diisoamyl ether, diethylene glycol diethyl ether, diethylene glycol dibutyl ether, tetrahydrofuran, and the like. Of these solvents, those having normal boiling points below 100° C. are preferred, as the thermal decomposition of the product during the distillation step will thus be minimized, when those of higher boiling point are used, the use of reduced pressure is also to be recommended. The preferred solvent is dimethyl ether because of its relatively high solubility for the reactants and for the other reasons mentioned above. Similar considerations apply to the choice of extractants used in the purification of the product.

The reactions of this invention may be carried out at any temperature within the normal liquid range of the solvent, or at a higher temperature if the liquid phase is maintained by the application of pressure, subject, of course, to the overriding requirement that the temperature not exceed the temperatures of incipient decomposition of the complex hydride reactants or products. Room temperature is perfectly satisfactory in most instances because of the high reaction rate, but an increased reaction rate may be obtained by use of somewhat higher temperatures. Thus, temperatures in the range of 0° to 100° C. and higher may be employed, although best results are obtained between 25° and 90° C. and this range is therefore preferred.

Because the reactions usually proceed rapidly under temperatures obtainable at normal pressure, atmospheric pressure is usually satisfactory, by pressures ranging from 10 mm. of mercury to 100 atmospheres may be used if desired.

The reactions of the invention can be carried out by the addition of either of the reactants to the other. However, in order to avoid the presence of an excess of the magnesium halide, and thus to avoid the formation of halomganesium aluminum hydride impurity, it is preferred to add the magnesium halide to the alkali metal aluminum hydride rather than the reverse.

The operations of mechanical separation of the impure reaction product, extraction of the magnesium aluminum hydride etherate, and evaporation of the solvent from the extract are subject to the same pressure and temperature limitations as the reactions of the invention. The conditions of temperature and pressure during decomposition of the etherate must be such that, under the pressure employed, the temperature in use is above the decomposition temperature of the etherate but below the decomposition temperature of the magnesium aluminum hydride product.

The magnesium aluminum hydride produced by the process of this invention is a valuable reducing agent for carbonyl compounds and for other functional organic compounds. It is also a useful source of hydrogen gas, particularly in field applications where the use of elaborate equipment is often highly inconvenient.

Having thus described the novel process of this invention, it is not intended that it be limited except as set forth in the following claims.

I claim:

1. A method for the preparation of magnesium aluminum hydride which comprises reacting sodium aluminum hydride with an anhydrous magnesium halide in an ether as reaction solvent said ether being selected from the group consisting of unsubstituted alkyl ethers, diethylene-glycol dialkyl ethers, and tetrahydrofuran, mechanically separating the impure solid reaction products, separating magnesium aluminum hydride etherate from said reaction product by treatment with an ether as extractant for said etherate said ether being selected from the group consisting of unsubstituted alkyl ethers, diethylene-glycol dialkyl ethers and tetrahydrofuran, removing said extractant from the extract by evaporation thereof to dryness, removing the complexed ether by heating said etherate under reduced pressure to a temperature not in excess of 100° C. and recovering essentially ether-free magnesium aluminum hydride.

2. The method of claim 1 wherein the magnesium halide is magnesium chloride.

3. The method of claim 1 wherein the reaction solvent is tetrahydrofuran.

4. The method of claim 1 wherein the reaction solvent is dimethyl ether.

5. The method of claim 1 wherein the reaction solvent is diethyl ether.

6. The method of claim 1 wherein the extractant is diethyl ether.

7. The method of claim 1 wherein the extractant is dimethyl ether.

8. The method of claim 1 wherein the complexed ether is removed by heating the etherate under a reduced pressure of essentially $10^{-3}$ mm. of mercury for 18 to 30 hours at a temperature not in excess of 60° C. and then for 30 minutes to 2 hours at a temperature not in excess of 95° C.

9. A process for the preparation of magnesium aluminum hydride, which comprises intermixing sodium aluminum hydride with magnesium chloride in a reaction medium consisting of tetrahydrofuran to thereby react the sodium aluminum hydride with magnesium chloride to obtain a precipitate of magnesium aluminum hydride solvated with the reaction medium and sodium chloride, separating the precipitate from the reaction mixture, contacting the precipitate with a selective solvent, said solvent being a member selected from the group consisting of said reaction medium and alkyl ethers, thereby to separate the solvated magnesium aluminum hydride from the remaining constituents in the precipitate, recovering the separated solid magnesium aluminum hydride in its solid form, heating the solid solvated magnesium aluminum hydride to a temperature in the range of 60° to 100° C. to desolvate the solvated magnesium aluminum hydride.

10. A process for the preparation of magnesium aluminum hydride, which comprises intermixing sodium aluminum hydride with magnesium chloride in a reaction medium consisting of tetrahydrofuran, to thereby react the sodium aluminum hydride with magnesium chloride to obtain a precipitate of magnesium aluminum hydride solvated with the reaction medium and sodium chloride, separating the precipitate from the reaction mixture, contacting the precipitate with selective solvent, said solvent being a member selected from the group consisting of the members of said reaction medium and alkyl ethers, thereby to separate the solvated magnesium aluminum hydride from the remaining constituents in the precipitate, recovering the separated solvated magnesium aluminum hydride in its solid form, heating the solid solvated magnesium aluminum hydride to a temperature in the range of from the decomposition temperature of the solvate to 120° C. to desolvate the solvated magnesium aluminum hydride.

* * * * *

PO-1050
(5/69)

UNITED STATES PATENT OFFICE
CERTIFICATE OF CORRECTION

Patent No. 3,639,104          Dated February 2, 1972

Inventor(s) Eugene C. Ashby, Walter E. Foster, Horace E. Redman

It is certified that error appears in the above-identified patent and that said Letters Patent are hereby corrected as shown below:

Column 1, line 2 reads "invention to", should read -- invention relates to --. Column 2, line 59 reads "($ClMgAlH_4 \cdot THF$)", should read -- ($ClMgAlH_4 \cdot 3.53\, THF$) --. Column 3, line 1 reads "$Mg(A_1H_4)_2 \cdot 3Me_2O.$", should read -- $Mg(AlH_4)_2 \cdot 3Me_2O.$ --; line 2 reads "$Mg(AlH_4)$, should read -- $Mg(AlH_4)_2$ --; line 12 reads "$Mg(AlH_4)_2 \cdot Et_2O.$", should read -- $Mg(AlH_4)_2 \cdot 1Et_2O.$ --; line 13 reads "$10^{-3}$", should read -- $10^{-3}$ mm --; line 27 (in the Table) reads "mg.", should read -- Mg, --; line 28 (in the Table) reads "al.", should read -- Al --. Column 4, line 12 reads "wit the", should read -- with the --; line 18 reads "solvent", should read -- solvents --; line 53 reads "by pressures", should read -- but pressures --. Column 6, line 28 reads "with selective", should read -- with a selective --.

Signed and sealed this 27th day of June 1972.

(SEAL)
Attest:

EDWARD M. FLETCHER, JR.          ROBERT GOTTSCHALK
Attesting Officer          Commissioner of Patents